US012700260B2

(12) United States Patent
Suzuki

(10) Patent No.: US 12,700,260 B2
(45) Date of Patent: Aug. 4, 2026

(54) SKELETON RECOGNITION DEVICE, TRAINING METHOD, AND STORAGE MEDIUM

(71) Applicant: FUJITSU LIMITED, Kawasaki (JP)

(72) Inventor: Tatsuya Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 418 days.

(21) Appl. No.: 18/193,700

(22) Filed: Mar. 31, 2023

(65) Prior Publication Data

US 2023/0237849 A1 Jul. 27, 2023

Related U.S. Application Data

(63) Continuation of application No. PCT/JP2020/044524, filed on Nov. 30, 2020.

(51) Int. Cl.
*G06V 40/20* (2022.01)
*G06V 10/774* (2022.01)

(52) U.S. Cl.
CPC ............ *G06V 40/23* (2022.01); *G06V 10/774* (2022.01)

(58) Field of Classification Search
None
See application file for complete search history.

(56) References Cited

U.S. PATENT DOCUMENTS

| | | | |
|---|---|---|---|
| 2006/0100818 A1 | 5/2006 | Nakamura et al. | |
| 2015/0036879 A1 | 2/2015 | Shiozaki et al. | |
| 2020/0184721 A1* | 6/2020 | Ge | G06T 7/50 |
| 2020/0258249 A1* | 8/2020 | Angelova | G06T 7/285 |

FOREIGN PATENT DOCUMENTS

| | | |
|---|---|---|
| JP | 2004-13474 A | 1/2004 |
| JP | 2015-167008 A | 9/2015 |
| JP | 2019-079487 A | 5/2019 |
| JP | 2019-191974 A | 10/2019 |

OTHER PUBLICATIONS

Oberweger et al., "Hands Deep in Deep Learning for Hand pose Estimation", DOI: 10.48550/arXiv.1502.06807, Publication Year: 2016 (Year: 2016).*

(Continued)

*Primary Examiner* — Chan S Park
*Assistant Examiner* — Promotto Tajrian Islam
(74) *Attorney, Agent, or Firm* — Fujitsu Intellectual Property Center

(57) ABSTRACT

A skeleton recognition device includes one or more memories; and one or more processors coupled to the one or more memories and the one or more processors configured to: acquire an output result by inputting teacher data to a training model and processing forward propagation, the teacher data having skeleton information that indicates positions of a plurality of bones of a human as a correct answer value, acquire a value of a loss function based on a difference in a bone length and a difference in an angle between the plurality of bones, the bone length and the angle being based on the skeleton information and the output result, and adjust parameters of the training model based on the value of the loss function.

3 Claims, 12 Drawing Sheets

(56) References Cited

OTHER PUBLICATIONS

Gao et al., "Physics-informed neural networks with adaptive loss weighting algorithm for solving partial differential equations"; DOI: 10.1016/j.camwa.2025.01.007, Publication Year: 2025 (Year: 2025).*

Ocampo et al., "Adaptive Loss Weighting for Machine Learning Interatomic Potentials"; DOI: 10.48550/arXiv.2403.18122, Publication Year: 2024 (Year: 2024).*

Wu, Min-Yu et al., "Hand pose estimation in object-interaction based on deep learning for virtual reality applications", Journal of Visual Communication and Image Representation, vol. 70, XP086216346, pp. 1-17, Apr. 4, 2020.

Chen, Tianlang et al., "Anatomy-aware 3D Human Pose Estimation in Videos", arxiv.org, XP081621285, pp. 1-17, Mar. 17, 2020, Retrieved from the Internet:URL: https://arxiv.org/pdf/2002.10322v3.pdf.

Extended European Search Report dated Oct. 4, 2023 for corresponding European Patent Application No. 20963613.3, 7 pages.

JPOA—Office Action of Japanese Patent Application No. 2022-565004 mailed on May 21, 2024 with Full Machine Translation [7 pages]. ** Non-Patent Literature by Min-Yu Wu, et al., cited in the JPOA was previously submitted in the IDS filed on Oct. 31, 2023.

CNOA—Office Action dated Feb. 28, 2025 for Chinese Patent Application No. 202080106146.8, with English translation ** Non-Patent Literature by Wu cited in CNOA was previously submitted in the IDS filed on Oct. 31, 2023.

Karim Iskakov et al., "Learnable Triangulation of Human Pose", Proceedings of the IEEE/CVF International Conference on Computer Vision (ICCV), Computer Vision Foundation, pp. 7718-7727, 2019 (Total 10 pages) (Cited in ISR).

Gyeongsik Moon et al., "V2V-PoseNet: Voxel-to-Voxel Prediction Network for Accurate 3D Hand and Human Pose Estimation from a Single Depth Map", IEEE Computer Society, 2018 IEEE/CVF Conference on Computer Vision and Pattern Recognition (CVPR), pp. 5079-5088, DOI: 10.1109/CVPR.2018.00533 (Total 10 pages).

International Search Report and Written Opinion of the International Searching Authority (Form PCT/ISA/210, 220, and 237), mailed in connection with PCT/JP2020/044524 and mailed Dec. 28, 2020 (Total 10 pages).

* cited by examiner

| INPUT DATA | CORRECT ANSWER VALUE |
|---|---|
| INPUT DATA (1) | CORRECT ANSWER VALUE (1) |
| INPUT DATA (2) | CORRECT ANSWER VALUE (2) |
| INPUT DATA (3) | CORRECT ANSWER VALUE (3) |
| ... | ... |

SKELETON RECOGNITION DEVICE, TRAINING METHOD, AND STORAGE MEDIUM

CROSS-REFERENCE TO RELATED APPLICATION

This application is a continuation application of International Application PCT/JP2020/044524 filed on Nov. 30, 2020 and designated the U.S., the entire contents of which are incorporated herein by reference.

FIELD

The present invention relates to a skeleton recognition device, a training method, and a storage medium.

BACKGROUND

For skeleton recognition that detects three-dimensional human movements, a 3D sensing technology has been established that extracts 3D skeleton coordinates with accuracy of ±1 cm from a plurality of 3D laser sensors, and is expected to be applied to various sports. A method using a 3D laser sensor is referred to as a "laser method".

In the laser method described above, a laser beam is irradiated approximately 2 million times per second, and depth data of each irradiation point including a target person is obtained based on a travel time (time of flight (ToF)) of the laser beam. Although the laser method may acquire highly accurate depth data, the laser method has a disadvantage that hardware is complex and expensive due to a complex configuration and processing such as laser scanning and ToF measurement.

In contrast to the laser method, in an image method that acquires RGB data of each pixel by a complementary metal oxide semiconductor (CMOS) imager, 3D skeleton recognition may be performed by using an inexpensive RGB camera.

For example, there is a conventional technology 1 as a conventional technology that performs skeleton recognition by the image method. FIG. 11 is a diagram for describing the conventional technology 1. In the conventional technology 1, 2D features 2 representing each joint feature are acquired by applying 2D backbone processing 1a to each input image 1. The conventional technology 1 acquires aggregated volumes 3 by projecting each of the 2D features 2 onto a 3D cube according to camera parameters.

The conventional technology 1 acquires processed volumes 5 representing likelihood of each joint by inputting the aggregated volumes 3 into V2V (neural network, P3) 4. The processed volumes 5 correspond to a heatmap representing likelihood of each joint in 3D. The conventional technology 1 acquires 3D skeleton information 7 by executing soft-argmax 6 for the processed volumes 5.

An example of training of the V2V 4 used in the conventional technology 1 will be described. The V2V 4 mainly includes 3D kernels, and is trained with weights and biases of kernels by backpropagation. The weights and the biases of the kernels are collectively referred to as "parameters" as appropriate. In the conventional technology 1, an average value $L_p$ of joint position errors is calculated as a Loss value from the 3D skeleton information output from the soft-argmax 6 and a correct answer value, and the parameters are trained (adjusted) so that this Loss value is minimized.

Here, in the conventional technology 1, when an error in a part of the joints increases due to occurrence of occlusion, it becomes difficult to appropriately adjust the parameters of the V2V 4. For example, when the error in the part of the joints is large but errors in other joints are small, the error in the part of the joints does not greatly affect output of a Loss function by averaging. In other words, the parameters of the V2V 4 are no longer adjusted to improve the error in the part of the joints.

FIG. 12 is a diagram illustrating an example of a skeleton with a large error in a part of joints. In FIG. 12, 3D skeleton information 10a is 3D skeleton information corresponding to a correct answer value. 3D skeleton information 10b corresponds to a skeleton recognition result output from the soft-argmax 6. In the example illustrated in FIG. 12, an error in a left ankle joint is large, but errors in other joints are small, so a Loss value is not greatly affected on average. Thus, it is not possible to expect a training effect that improves a left ankle position.

There is a conventional technology 2 for the problem described above. In the conventional technology 2, in a first stage, joint positions are estimated based on a distance image, and in a second stage, integrity of the estimated joint positions is evaluated based on a human body model, and the estimated joint positions are corrected so as to obtain the best combination of the joint positions. In the conventional technology 2, accuracy of estimating the joint positions is improved by performing processing in the two stages as described above.

Patent Document 1: Japanese Laid-open Patent Publication No. 2015-167008, Patent Document 2: Japanese Laid-open Patent Publication No. 2004-13474, Non-Patent Document 1: K. Iskakov, et al., "Learnable Triangulation of Human Pose", ICCV 2019, oral, and Non-Patent Document 2: G. Moon, et al., "V2V-PoseNet:Voxel-to-Voxel Prediction Network for Accurate 3D Hand and Human Pose Estimation from a Single Depth Map", CVPR 2018.

SUMMARY

According to an aspect of the embodiments, a skeleton recognition device includes one or more memories; and one or more processors coupled to the one or more memories and the one or more processors configured to: acquire an output result by inputting teacher data to a training model and processing forward propagation, the teacher data having skeleton information that indicates positions of a plurality of bones of a human as a correct answer value, acquire a value of a loss function based on a difference in a bone length and a difference in an angle between the plurality of bones, the bone length and the angle being based on the skeleton information and the output result, and adjust parameters of the training model based on the value of the loss function.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of a data structure of teacher data;

FIG. 9 is a diagram for describing an effect of the present embodiment;

DESCRIPTION OF EMBODIMENTS

In the conventional technology 2 described above, although the accuracy of estimating the joint positions is improved, there is a problem that the processing in the two stages is executed before the corrected joint positions are output, and it takes time for skeleton recognition.

In one aspect, an object of the present invention is to provide a skeleton recognition device, a training method, and a training program capable of obtaining a skeleton recognition result without much processing time.

It is possible to obtain a skeleton recognition result without much processing time.

Hereinafter, an embodiment of a skeleton recognition device, a training method, and a training program disclosed in the present application will be described in detail with reference to the drawings. Note that this invention is not limited by this embodiment.

EMBODIMENT

Figure 1:
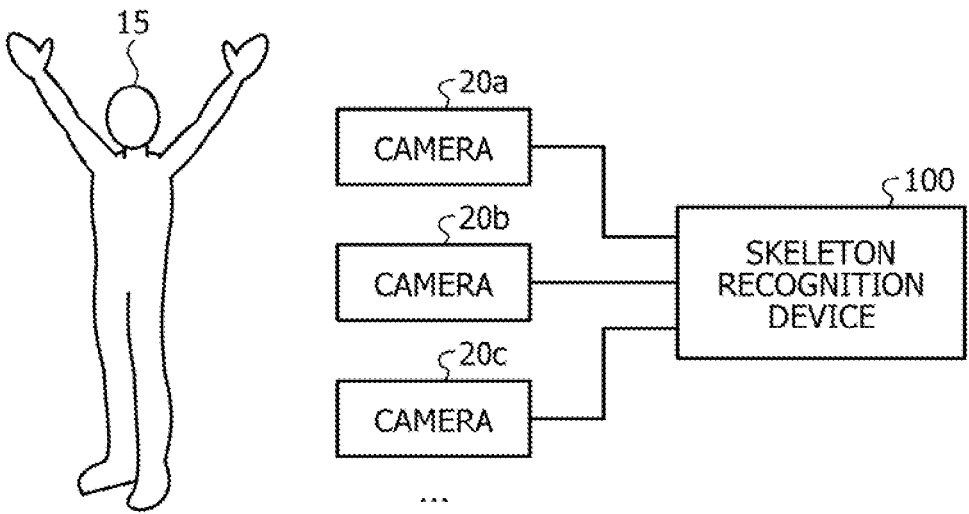
FIG. 1 is a diagram illustrating an example of a system according to the present embodiment.

FIG. 1 is a diagram illustrating an example of a system according to the present embodiment. As illustrated in FIG. 1, this system includes cameras 20a, 20b, and 20c and a skeleton recognition device 100. The cameras 20a to 20c and the skeleton recognition device 100 are coupled to each other wirelessly or wiredly.

In the system of FIG. 1, the cameras 20a to 20c are illustrated as an example, but another camera may be included. In the following description, the cameras 20a to 20c are collectively referred to as a camera 20.

The camera 20 is a device that captures an image of a person 15. The camera 20 transmits data of the captured image to the skeleton recognition device 100. In the following description, the data of the image of the person 15 is referred to as image data. As will be described later, the image data is used in an inference phase of the skeleton recognition device 100.

The skeleton recognition device 100 executes training of a training model for performing skeleton recognition by executing processing in a "preprocessing phase" and a "training phase" using teacher data. Furthermore, in the "inference phase", the skeleton recognition device 100 outputs a skeleton recognition result of the person 15 based on the image data input from the camera 20 and the trained training model.

Figure 2:
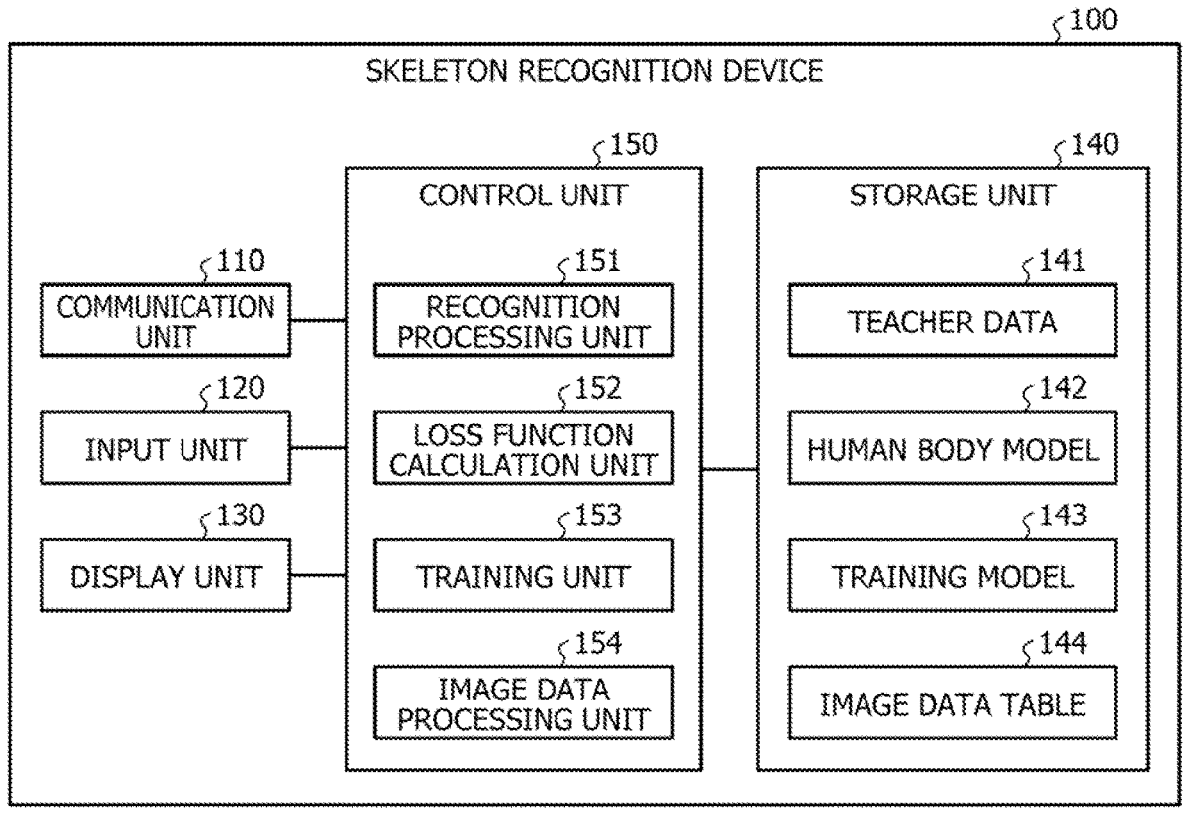
FIG. 2 is a functional block diagram illustrating a configuration of a skeleton recognition device according to the present embodiment.

Next, an example of a configuration of the skeleton recognition device according to the present embodiment will be described. FIG. 2 is a functional block diagram illustrating the configuration of the skeleton recognition device according to the present embodiment. As illustrated in FIG. 2, this skeleton recognition device 100 includes a communication unit 110, an input unit 120, a display unit 130, a storage unit 140, and a control unit 150.

The communication unit 110 is wiredly or wirelessly coupled to an external device or the like, and transmits and receives information to and from the camera 20, the external device, or the like. For example, the communication unit 110 is implemented by a network interface card (NIC) or the like. The control unit 150 acquires image data from the camera 20 via the communication unit 110. The communication unit 110 may be coupled to a network (not illustrated).

The input unit 120 is an input device that inputs various types of information to the skeleton recognition device 100. The input unit 120 corresponds to a keyboard, a mouse, a touch panel, or the like.

The display unit 130 is a display device that displays information output from the control unit 150. The display unit 130 corresponds to a liquid crystal display, an organic electro luminescence (EL) display, a touch panel, or the like.

The storage unit 140 includes teacher data 141, a human body model 142, a training model 143, and an image data table 144. The storage unit 140 is implemented by, for example, a semiconductor memory element such as a random access memory (RAM) or a flash memory, or a storage device such as a hard disk or an optical disk.

The teacher data 141 is data used for training of the training model 143. FIG. 3 is a diagram illustrating an example of a data structure of the teacher data. As illustrated in FIG. 3, the teacher data 141 includes a plurality of pairs of input data and correct answer values. The input data is data generated from a plurality of pieces of image data prepared in advance, and corresponds to, for example, "aggregated volumes" or the like. The correct answer value is a correct answer value of a skeleton recognition result corresponding to the input data, and includes, for example, information such as three-dimensional coordinates of each joint, a length of bones linking joints, and an angle between bones.

Figure 4:
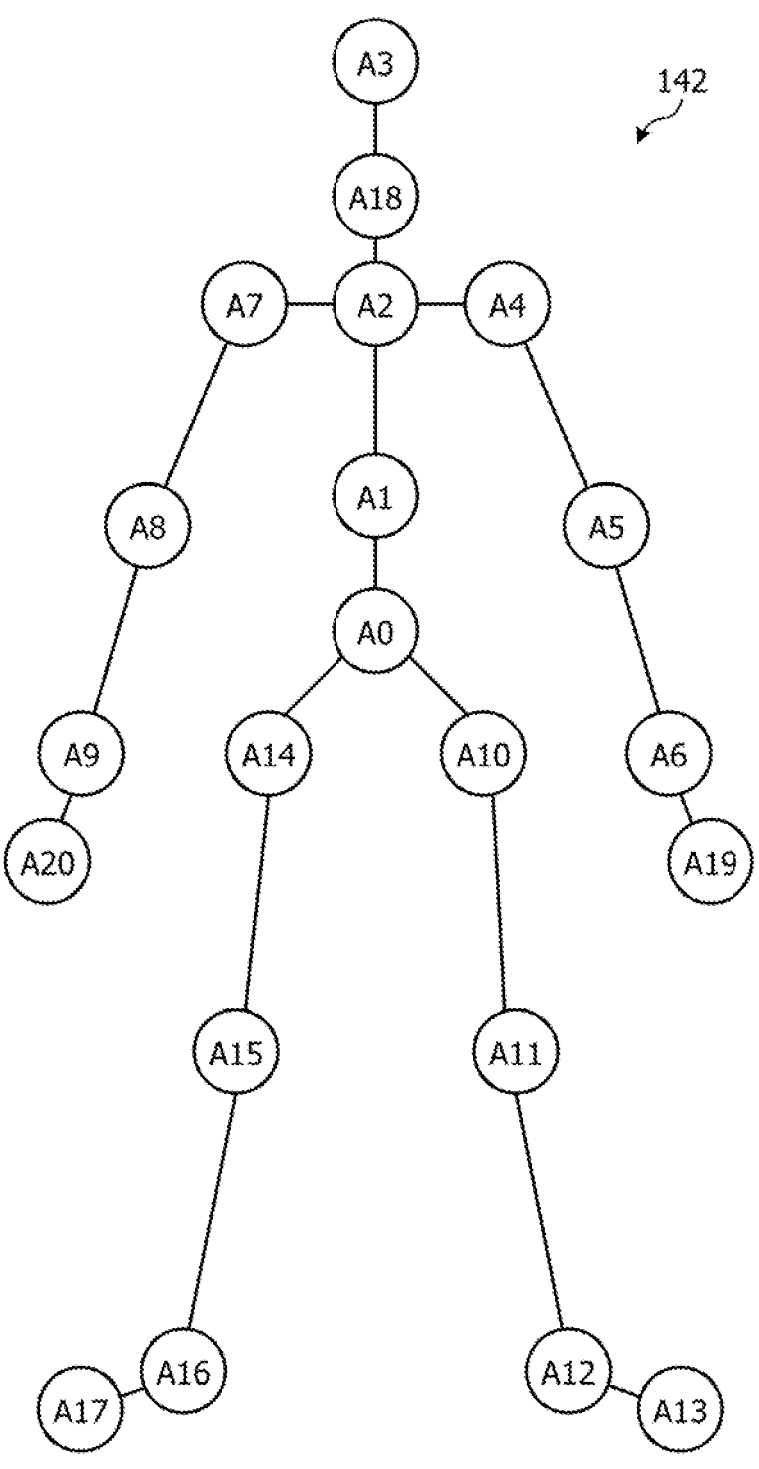
FIG. 4 is a diagram illustrating an example of a data structure of a human body model.

The human body model 142 is a human body model defined in advance, in which a plurality of joints is defined and the respective joints are coupled by bones. FIG. 4 is a diagram illustrating an example of a data structure of the human body model. As illustrated in FIG. 4, this human body model 142 includes joints A0, A1, A2, A3, A4, A5, A6, A7, A8, A9, A10, A11, A12, A13, A14, A15, A16, A17, A18, A19, A20, and A21. Furthermore, in the human body model 142, 20 bones coupling the respective joints are defined.

The training model 143 corresponds to a neural network (NN) such as V2V. For example, the training model 143 includes 3D kernels, and parameters (weights, biases, and the like) are set in the kernels. The parameters are adjusted by the processing in the training phase, which will be described later.

The image data table 144 is a table for registering image data output from the camera 20 in the "inference phase". For example, the image data table 144 holds identification information of the camera 20 and image data captured by the camera 20 in association with each other.

The description returns to FIG. 2. The control unit 150 includes a recognition processing unit 151, a loss function calculation unit 152, a training unit 153, and an image data processing unit 154. The control unit 150 is implemented by, for example, a central processing unit (CPU) or a micro processing unit (MPU). Furthermore, the control unit 150 may be executed by, for example, an integrated circuit such as an application specific integrated circuit (ASIC) or a field programmable gate array (FPGA).

The control unit 150 sequentially executes (1) the processing in the preprocessing phase, (2) the processing in the training phase, and (3) the processing in the inference phase. Here, for convenience of description, first, the "processing in the training phase" is described, then the "processing in the preprocessing phase" is described, and finally the "processing in the inference phase" is described.

Figure 5:
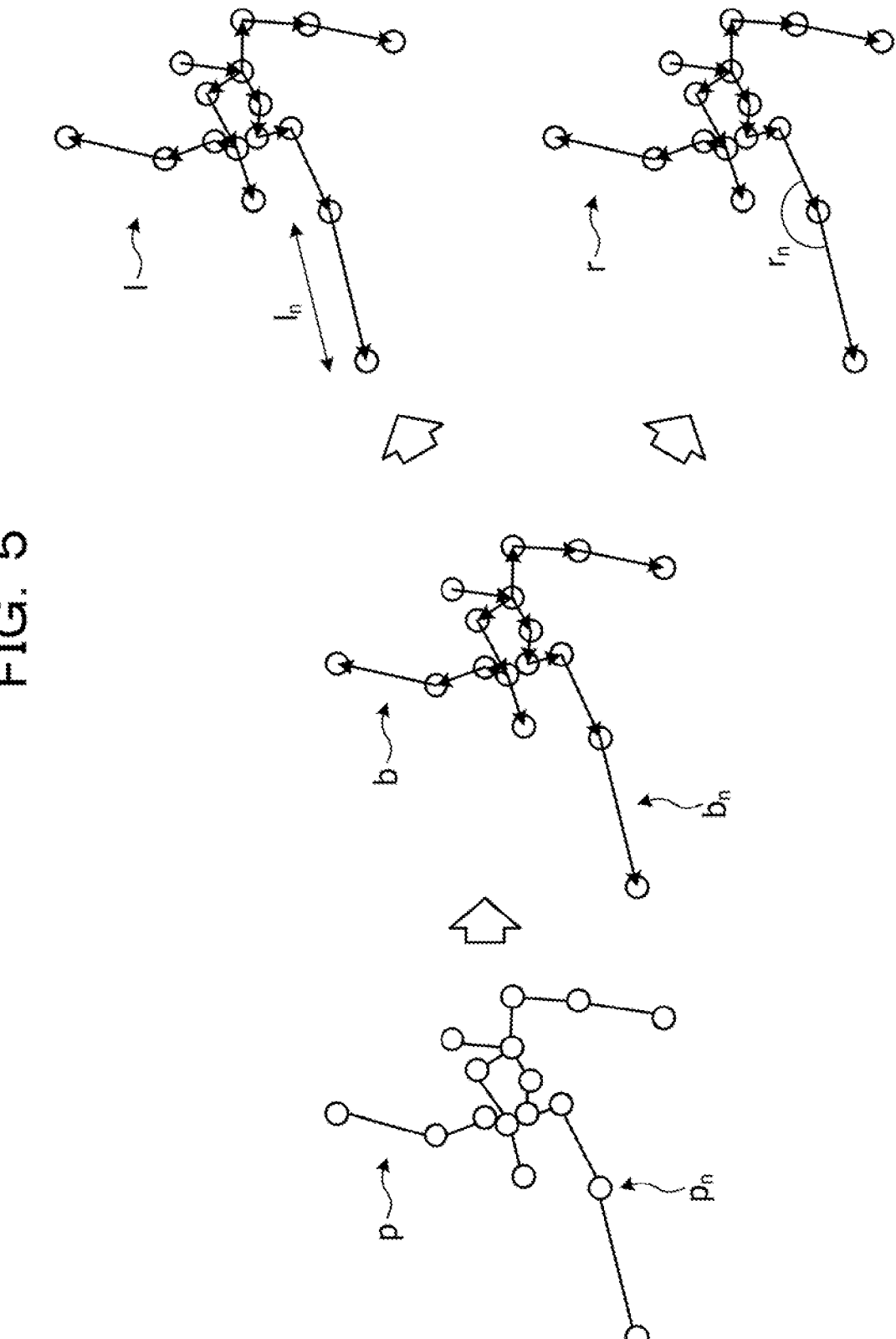
FIG. 5 is a diagram for describing processing in a training phase.

The "processing in the training phase" executed by the control unit 150 will be described. FIG. 5 is a diagram for describing the processing in the training phase. In a case where the control unit 150 executes the training phase, the recognition processing unit 151, the loss function calculation unit 152, and the training unit 153 execute the following processing.

Processing of the recognition processing unit 151 in the training phase will be described. The recognition processing unit 151 inputs input data included in the teacher data 141 to the training model 143, and calculates output (skeleton recognition result $p=(p_1, p_2, \ldots, p_{Np})$) by forward propagation. "$p_1, p_2, \ldots, p_{Np}$" indicate the respective joints, and three-dimensional coordinates are set. In the example illustrated in FIG. 5, a certain joint is indicated by $p_n$ in the skeleton recognition result p.

More specifically, the recognition processing unit 151 calculates a heatmap indicating likelihood of each joint in 3D by inputting the input data to the training model 143, and calculates the skeleton recognition result p by executing soft-argmax to obtain a center of gravity of the heatmap.

The recognition processing unit 151 outputs the skeleton recognition result to the loss function calculation unit 152. By repeatedly executing the processing described above for each piece of input data included in the teacher data 141, the recognition processing unit 151 calculates the skeleton recognition result corresponding to each piece of input data, and outputs the calculated skeleton recognition result to the loss function calculation unit 152.

Processing of the loss function calculation unit 152 in the training phase will be described. The loss function calculation unit 152 executes processing of calculating an error in a bone length as a Loss value, processing of calculating an error in an angle between bones as a Loss value, and processing of integrating the Loss values.

The "processing of calculating an error in a bone length as a Loss value" executed by the loss function calculation unit 152 will be described. By associating each joint of the skeleton recognition result p with each joint of the human body model 142, the loss function calculation unit 152 calculates a bone vector $b=(b_1, b_2, \ldots, b_{Np})$. In the example illustrated in FIG. 5, a certain bone vector is indicated by $b_n$ in the bone vector b.

The loss function calculation unit 152 calculates a bone length $l=(l_1, l_2, \ldots, l_{Np})$ from the bone vector b. In the example illustrated in FIG. 5, a certain bone length is indicated by $l_n$ in the bone length l.

From a difference between the bone length l and a correct answer value of the teacher data 141 (a correct answer value of the bone length), the loss function calculation unit 152 calculates a Loss value of the bone length based on Expression (1). The Loss value of the bone length is referred to as "$L_l$". In Expression (1), $N_l$ indicates the number of bones (for example, $N_l=20$). $l^{pred}_i$ is the bone length estimated from the bone vector b, and is an i-th bone length. $l^{gt}_i$ is the bone length of the correct answer value, and is the i-th bone length.

[Expression 1]

$$L_l = \sum_{i=1}^{N_l} \frac{\left(l^{pred}_i - l^{gt}_i\right)^2}{N_l} \tag{1}$$

The "processing of calculating an error in an angle between bones as a Loss value" executed by the loss function calculation unit 152 will be described. The loss function calculation unit 152 calculates an angle between bones $r=(r_1, r_2, \ldots, r_{Np})$ from the bone vector b. In the example illustrated in FIG. 5, a certain angle between bones is indicated by $r_n$ in the angle between bones r.

From a difference between the angle between bones r and a correct answer value of the teacher data 141 (a correct answer value of the angle between bones), the loss function calculation unit 152 calculates a Loss value of the angle between bones based on Expression (2). The Loss value of the angle between bones is referred to as "$L_r$". In Expression (2), $N_r$ indicates the number of angles between bones. $r^{pred}_i$ is the angle between bones estimated from the bone vector b, and is an i-th angle between bones. $r^{gt}_i$ is the angle between bones of the correct answer value, and is the i-th angle between bones.

[Expression 2]

$$L_r = \sum_{i=1}^{N_r} \frac{\left(r^{pred}_i - r^{gt}_i\right)^2}{N_r} \tag{2}$$

The "processing of integrating the Loss values" executed by the loss function calculation unit 152 will be described. The loss function calculation unit 152 calculates a joint coordinate Loss value based on the skeleton recognition result p and a correct answer value of the teacher data 141 (three-dimensional coordinates of each joint). The joint coordinate Loss value is referred to as "$L_p$". Although an expression is omitted, $L_p$ is a value obtained by averaging errors in the three-dimensional coordinates of each joint.

The loss function calculation unit 152 integrates the Loss values based on Expression (3). A Loss value obtained by the integration is referred to as "L". The loss function calculation unit 152 outputs the Loss value L to the training unit 153. $w_l$ and $w_r$ included in Expression (3) are weights calculated in advance in the "preprocessing phase" so that $L_l$ and $L_r$ are not overfitted.

[Expression 3]

$$L=L_p+w_l L_l+w_r L_r \tag{3}$$

The loss function calculation unit 152 repeatedly executes the processing described above each time when the skeleton recognition result p is acquired from the recognition processing unit 151.

Incidentally, the loss function calculation unit 152 may use a technology such as Kinematic Chain Space in a case where the bone length and the angle between bones are calculated. For example, the Kinematic Chain Space is described in "B. Wandt, et al., "A kinematic chain space for monocular motion capture", (ECCV Work-shops, 2018)". In the following description, the Kinematic Chain Space is referred to as "KCS". In the KCS, a matrix B that summarizes the bone vectors b is calculated. The matrix B is indicated in Expression (4).

[Expression 4]

$$B=(b_1, b_2, \ldots, b_b) \qquad (4)$$

The loss function calculation unit 152 calculates a feature $\psi$ indicating a product of a transposed matrix $B^T$ of the matrix B and B. The feature $\psi$ is indicated by Expression (5). A diagonal component of the feature $\psi$ corresponds to the bone length, and a non-diagonal component corresponds to the angle between bones.

[Expression 5]

$$\Psi = B^T B = \begin{pmatrix} l_1^2 & \cdots & \cdots & \cdots \\ \cdots & l_1^2 & \cdots & \cdots \\ \cdots & \cdots & \ddots & \cdots \\ \cdots & \cdots & \cdots & l_b^2 \end{pmatrix} \qquad (5)$$

The loss function calculation unit 152 calculates an average value $L_{KCS}$ of a difference between the feature $\psi$ and a correct answer value (GT) of the teacher data 141 by Expression (6). In Expression (6), $\psi^{pred}_{ij}$ indicates an element at an i-th row and a j-th column of Expression (6). $\psi^{gt}_{ij}$ is an element of a correct answer value corresponding to $\psi^{pred}_{ij}$. b corresponds to the number of elements in the matrix B.

[Expression 6]

$$L_{kcs} = \sum_{i=1}^{b} \sum_{j=1}^{b} \frac{(\Psi^{pred}_{ij} - \Psi^{gt}_{ij})^2}{b^2} \qquad (6)$$

In the description above, the case has been described where the technology such as the Kinematic Chain Space is used in the case of calculating the bone length and the angle between bones, but the present invention is not limited to this. The loss function calculation unit 152 may calculate the bone length by using a Euclidean distance. The loss function calculation unit 152 may calculate the angle between bones by using cos similarity.

Processing of the training unit 153 in the training phase will be described. The training unit 153 repeatedly executes processing of training (adjusting) the parameters of the training model 143 by backpropagation such that the Loss value L is minimized. The training unit 153 ends adjusting the parameters of the training model 143 in a case where the Loss value L converges.

In the training phase, as indicated in Expression (3), the Loss value L is calculated by using "$L_l$" regarding an error in the bone length considering a human body and "$L_r$" regarding an error in the angle between bones. Thus, a degree of contribution to the Loss value L becomes high in a case where a part of joints is greatly displaced. With this configuration, in a case where an error in a part of joints is large, training to improve such an error may be executed.

Next, the "preprocessing phase" executed by the control unit 150 will be described. In the preprocessing phase, $w_l$ and $w_r$ used in the training phase are calculated. In the training phase, in a case where the Loss values are integrated by using Expression (3), "$w_l$" is calculated from a relative value between the joint coordinate Loss value "$L_p$" and the Loss value "$L_l$" of the bone length so that $L_l$ and $L_r$ are not overfitted. "$w_r$" is calculated from a relative value between the joint coordinate Loss value "$L_p$" and the Loss value "$L_r$" of the angle between bones.

In a case where the control unit 150 executes the preprocessing phase, the recognition processing unit 151, the loss function calculation unit 152, and the training unit 153 execute the following processing.

Processing of the recognition processing unit 151 in the preprocessing phase will be described. The processing of the recognition processing unit 151 in the preprocessing phase is similar to the processing of the recognition processing unit 151 in the training phase. In other words, the recognition processing unit 151 inputs input data included in the teacher data 141 to the training model 143, and calculates output (skeleton recognition result $p=(p_1, p_2, \ldots, p_{Np})$) by forward propagation. The recognition processing unit 151 outputs the skeleton recognition result p to the loss function calculation unit 152.

Processing of the loss function calculation unit 152 in the preprocessing phase will be described. The loss function calculation unit 152 calculates each of the Loss value "$L_l$" of the bone length, the Loss value "$L_r$" of the angle between bones, and the joint coordinate Loss value "$L_p$" in a similar manner to the processing of the loss function calculation unit 152 in the training phase.

Here, the loss function calculation unit 152 outputs only the joint coordinate Loss value "$L_p$" to the training unit 153. The loss function calculation unit 152 repeatedly executes the processing described above each time when the skeleton recognition result p is acquired from the recognition processing unit 151.

In a case where information that the joint coordinate Loss value "$L_p$" has converged is received from the training unit 153, the loss function calculation unit 152 calculates an order of each of "$L_l$", "$L_r$", and "$L_p$" at the point when the joint coordinate Loss value "$L_p$" has converged. It is assumed that the order of "$L_l$" is "$o_{Ll}$". It is assumed that the order of "$L_r$" is "$o_{Lr}$". It is assumed that the order of "$L_p$" is "$o_{Lp}$".

For example, the loss function calculation unit 152 sets "$o_{Lp}=10^{-3}$" in a case where $L_p=4.0\times10^{-3}$. The loss function calculation unit 152 similarly calculates "$o_{Ll}$" and "$o_{Lp}$".

The loss function calculation unit 152 calculates the weight $w_l$ based on Expression (7). The weight $w_r$ is calculated based on Expression (8). Such weights $w_l$ and $w_r$ are used in the training phase. Since $L_l$ and $L_r$ do not exceed the order of $L_p$ by determining the weights $w_l$ and $w_r$ by the loss function calculation unit 152 through the processing described above, $L_l$ and $L_r$ may appropriately affect training while avoiding overfitting of $L_l$ and $L_r$.

[Expression 7]

$$w_l = \frac{o_{Lp}}{o_{Ll}} \qquad (7)$$

[Expression 8]

$$w_r = \frac{o_{Lp}}{o_{Lr}} \qquad (8)$$

Processing of the training unit 153 in the preprocessing phase will be described. The training unit 153 repeatedly executes processing of training (adjusting) the parameters of the training model 143 by backpropagation such that the Loss value $L_p$ is minimized. The training unit 153 ends adjusting the parameters of the training model 143 in a case where the Loss value $L_p$ converges.

In a case where the Loss value $L_p$ converges, the training unit 153 outputs, to the loss function calculation unit 152, that the Loss value $L_p$ has converged, and ends the training.

Next, the "inference phase" executed by the control unit 150 will be described. In a case where the control unit 150 executes the inference phase, the recognition processing unit 151 and the image data processing unit 154 execute the following processing.

Processing of the recognition processing unit 151 in the inference phase will be described. The recognition processing unit 151 acquires input data from the image data processing unit 154. The recognition processing unit 151 inputs the acquired input data to the trained training model 143, and calculates output (skeleton recognition result of the person 15) by forward propagation. The recognition processing unit 151 may output the skeleton recognition result to the display unit 130 for display, or may output the skeleton recognition result to an external device that executes various types of processing by using the skeleton recognition result.

The recognition processing unit 151 repeatedly executes the processing described above each time the input data is acquired from the image data processing unit 154.

Processing of the image data processing unit 154 in the inference phase will be described. The image data processing unit 154 acquires image data from the camera 20, and stores the acquired image data in the image data table 144. The image data processing unit 154 specifies 2D features representing each joint feature by applying 2D backbone processing to the image data. The image data processing unit 154 calculates aggregated volumes by projecting each of the 2D features onto a 3D cube according to camera parameters, and outputs the calculated aggregated volumes to the recognition processing unit 151 as input data.

Note that the processing described above in which the image data processing unit 154 calculates the input data based on each piece of image data is an example, and the input data may be calculated by integrating a plurality of pieces of image data by using another technology. The image data processing unit 154 acquires image data from the camera 20 every hour, and repeatedly executes the processing described above.

Figure 6:
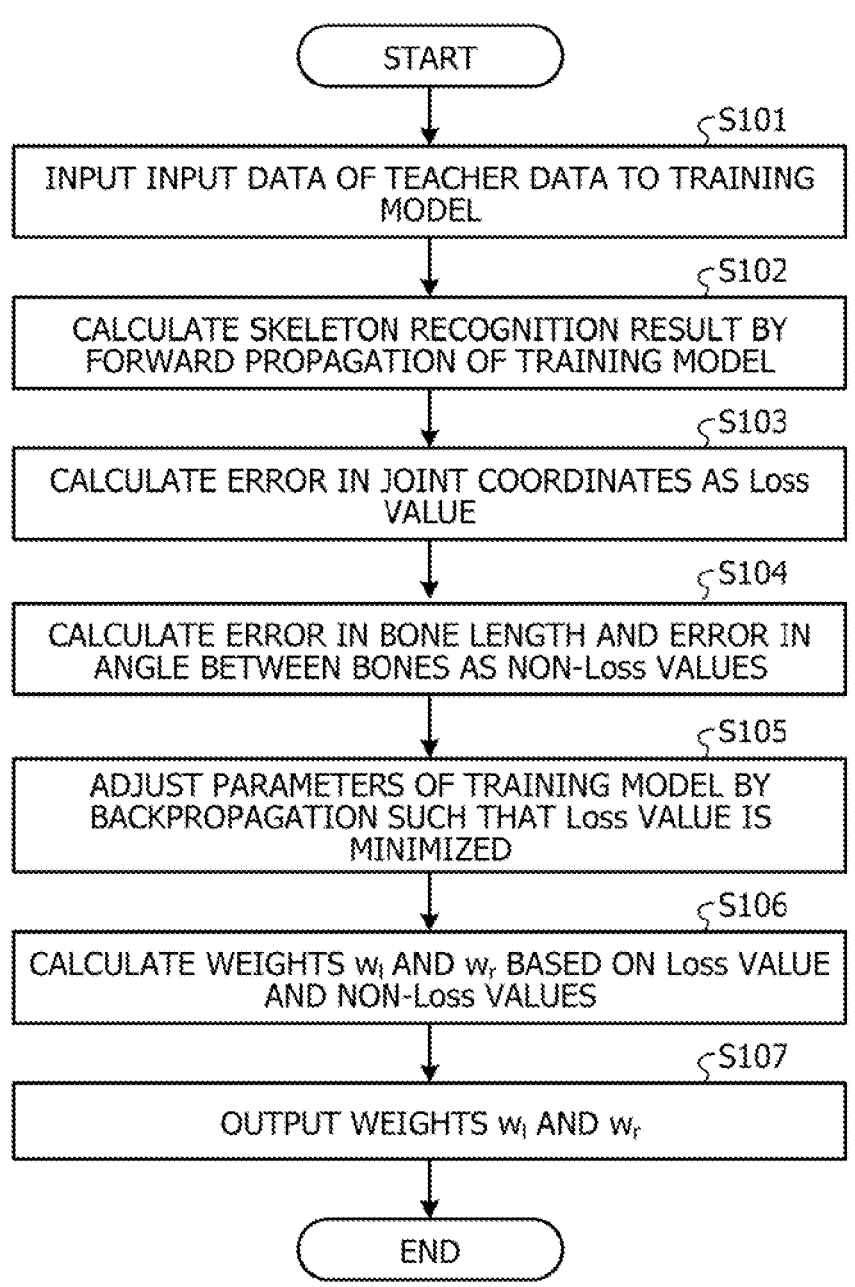
FIG. 6 is a flowchart illustrating a processing procedure of a preprocessing phase of the skeleton recognition device.

Next, an example of a processing procedure of the skeleton recognition device 100 according to the present embodiment will be described. FIG. 6 is a flowchart illustrating a processing procedure of the preprocessing phase of the skeleton recognition device. As illustrated in FIG. 6, the recognition processing unit 151 of the skeleton recognition device 100 inputs input data of the teacher data 141 to the training model 143 (Step S101). The recognition processing unit 151 calculates a skeleton recognition result by forward propagation of the training model 143 (Step S102).

The loss function calculation unit 152 of the skeleton recognition device 100 calculates an error in joint coordinates as a Loss value (Step S103). The loss function calculation unit 152 calculates an error in a bone length and an error in an angle between bones as non-Loss values (Step S104).

The training unit 153 of the skeleton recognition device 100 adjusts the parameters of the training model 143 by backpropagation such that the Loss value is minimized (Step S105).

The loss function calculation unit 152 calculates the weights $w_l$ and $w_r$ based on the Loss value and the non-Loss values (Step S106). The loss function calculation unit 152 outputs the weights $w_l$ and $w_r$ (Step S107).

Figure 7:
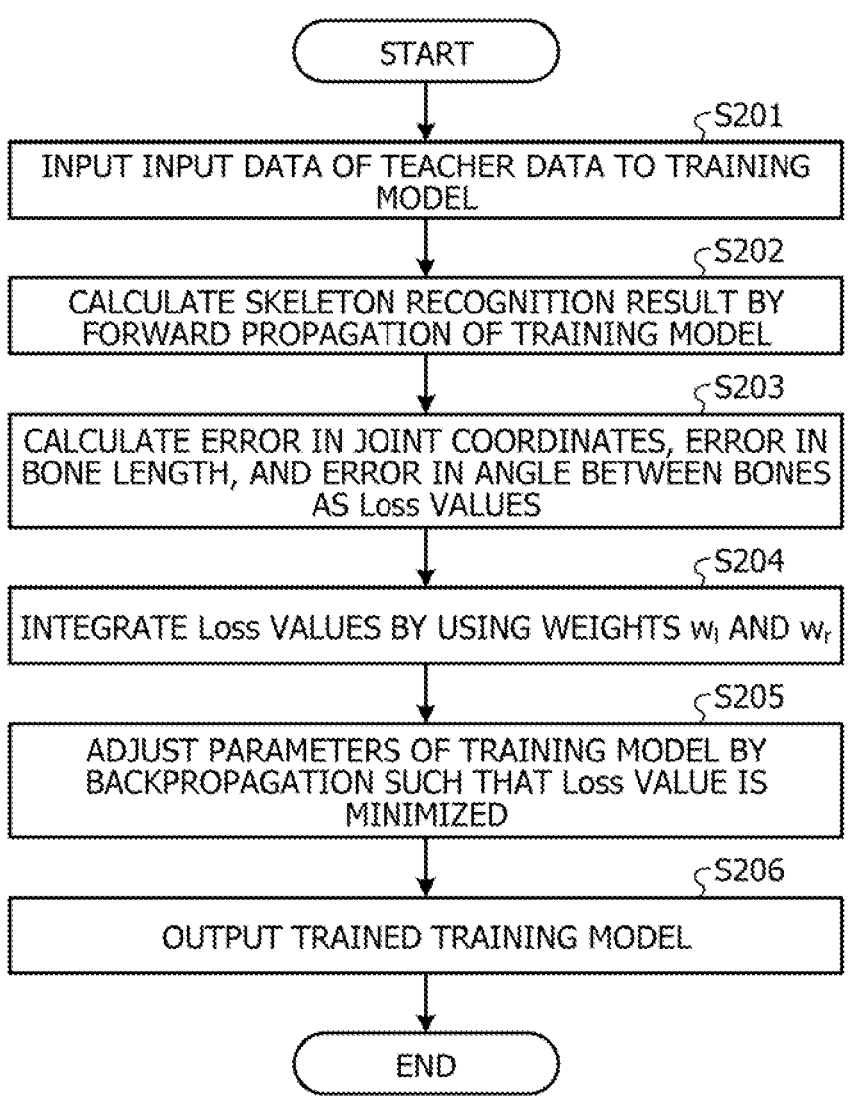
FIG. 7 is a flowchart illustrating a processing procedure of the training phase of the skeleton recognition device.

FIG. 7 is a flowchart illustrating a processing procedure of the training phase of the skeleton recognition device. As illustrated in FIG. 7, the recognition processing unit 151 of the skeleton recognition device 100 inputs input data of the teacher data 141 to the training model 143 (Step S201). The recognition processing unit 151 calculates a skeleton recognition result by forward propagation of the training model 143 (Step S202).

The loss function calculation unit 152 of the skeleton recognition device 100 calculates an error in joint coordinates, an error in a bone length, and an error in an angle between bones as Loss values (Step S203). The loss function calculation unit 152 integrates the Loss values by using the weights $w_l$ and $w_r$ (Step S204).

The training unit 153 of the skeleton recognition device 100 adjusts the parameters of the training model 143 by backpropagation such that the Loss value is minimized (Step S205). The training unit 153 outputs the trained training model 143 (Step S206).

Figure 8:
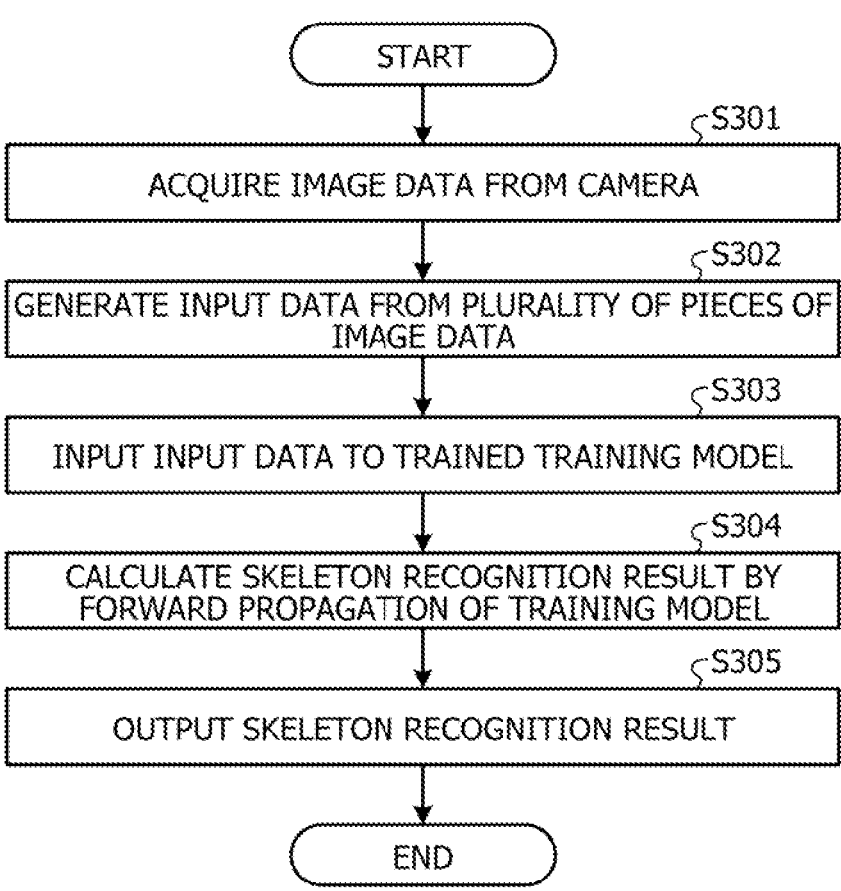
FIG. 8 is a flowchart illustrating a processing procedure of an inference phase of the skeleton recognition device.

FIG. 8 is a flowchart illustrating a processing procedure of the inference phase of the skeleton recognition device. As illustrated in FIG. 8, the image data processing unit 154 of the skeleton recognition device 100 acquires image data from the camera 20 (Step S301).

The image data processing unit 154 generates input data from a plurality of pieces of image data (Step S302). The recognition processing unit 151 of the skeleton recognition device 100 inputs the input data to the trained training model 143 (Step S303).

The recognition processing unit 151 calculates a skeleton recognition result by forward propagation of the training model 143 (Step S304). The recognition processing unit 151 outputs the skeleton recognition result (Step S305).

Next, an effect of the skeleton recognition device 100 according to the present embodiment will be described. The skeleton recognition device 100 calculates a skeleton recognition result by inputting input data of teacher data to the training model 143, calculates an error in a bone length and an error in an angle between bones by comparing the skeleton recognition result with a correct answer value of the teacher data, and calculates a Loss value of a loss function. By adjusting the parameters of the training model 143 so that such a Loss value of the loss function is minimized, it is possible to increase a degree of contribution to the Loss value in a case where a part of joints is greatly displaced, and in a case where an error in a part of joints is large, it is possible to perform training to improve such an error. Furthermore, by performing such training, it is possible to calculate the skeleton recognition result of the person 15 by the processing in one stage in which the input data is input to the trained training model 143, and it is possible to improve a processing speed compared to the conventional technology 2 that executes the processing in two stages.

More specifically, by calculating each of an error in joint coordinates, the error in the bone length, and the error in the angle between bones by comparing with the correct answer value of the teacher data and calculating the Loss value of the loss function, the skeleton recognition device 100 may train the parameters of the training model 143 with high accuracy.

The skeleton recognition device 100 calculates the weight $w_l$ based on Expression (7), and calculates the weight $w_r$ based on Expression (8). Such weights $w_l$ and $w_r$ are used in the training phase. Since the error $L_l$ in the bone length and the error $L_r$ in the angle between bones do not exceed the order of the error $L_p$ in the joint coordinates by determining the weights $w_l$ and $w_r$, $L_l$ and $L_r$ may appropriately affect training while avoiding overfitting of $L_l$ and $L_r$.

Figure 9:
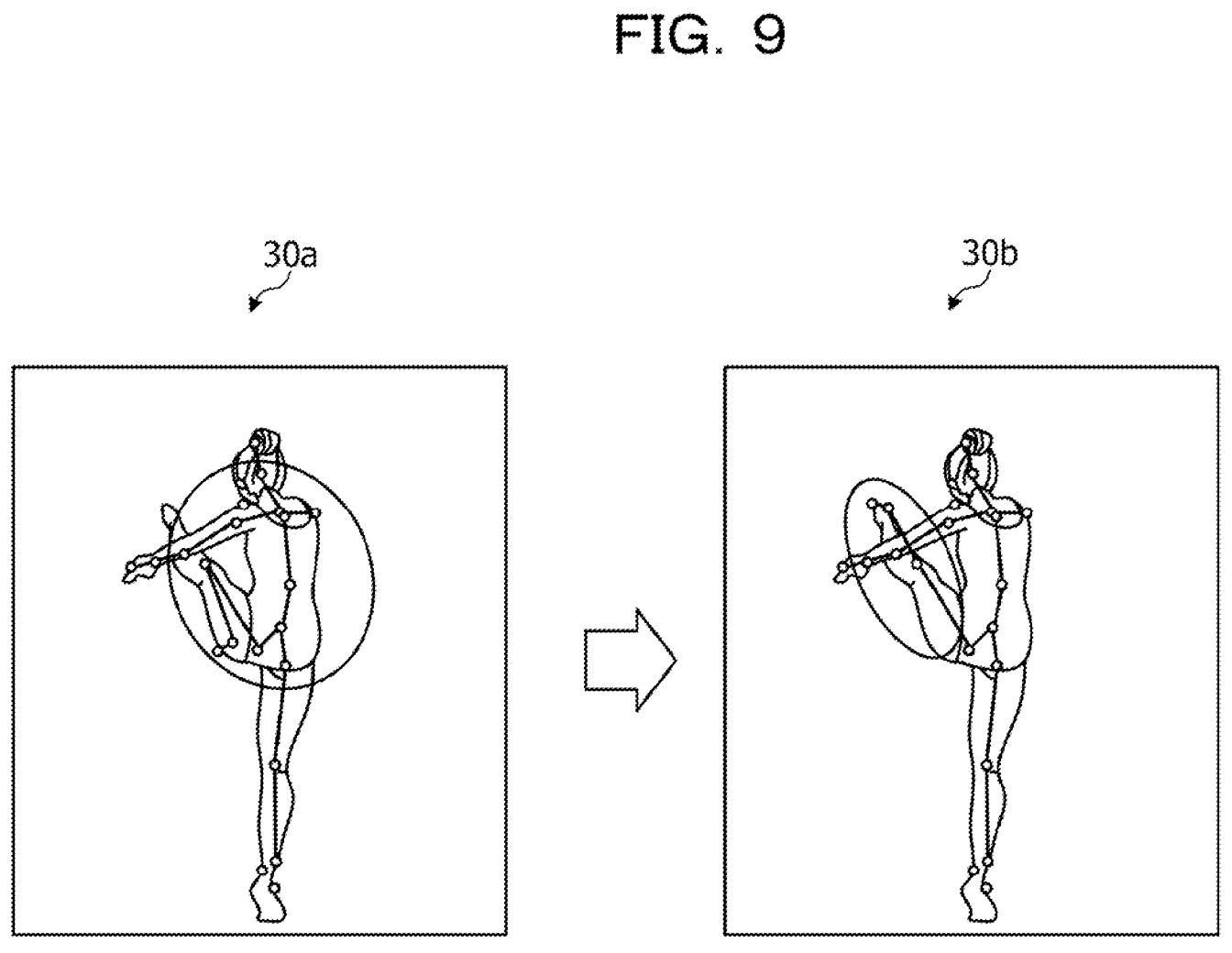

FIG. 9 is a diagram for describing the effect of the present embodiment. In FIG. 9, a skeleton recognition result 30*a* is a skeleton recognition result by the conventional technology 1, and an angle of a left knee is abnormal. A skeleton recognition result 30*b* is a skeleton recognition result of the skeleton recognition device 100 according to the present embodiment, and the angle of the left knee is normalized.

Figure 10:
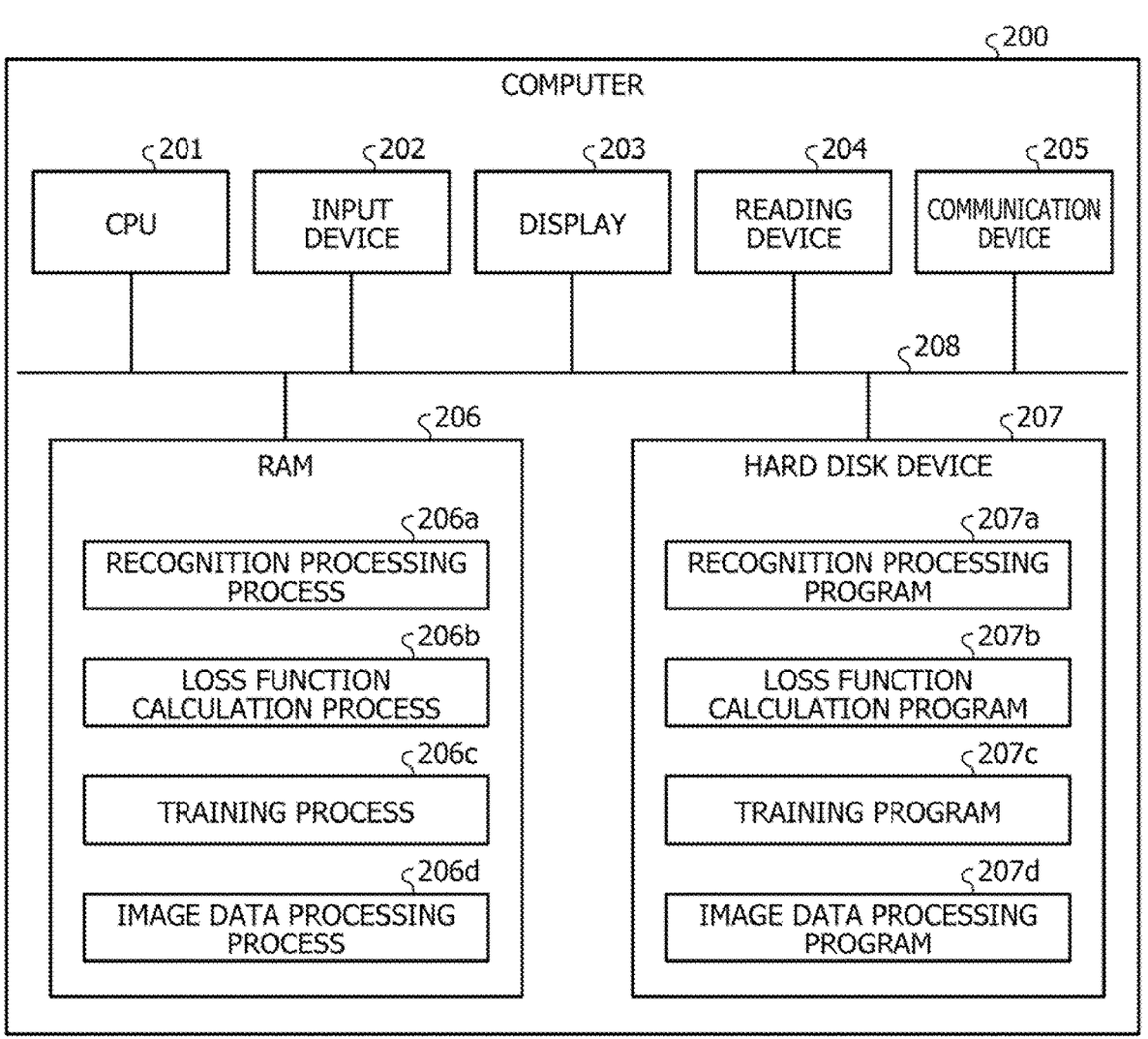
FIG. 10 is a diagram illustrating an example of a hardware configuration of a computer that implements functions similar to those of the skeleton recognition device of the embodiment.
Figure 11:
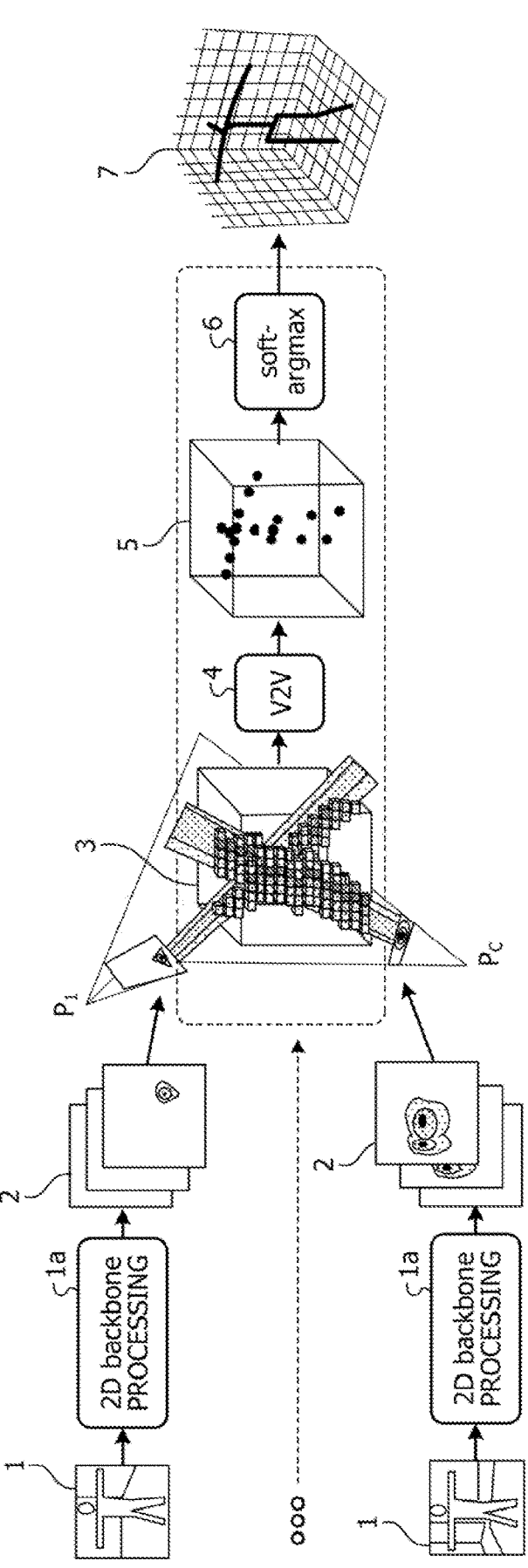
FIG. 11 is a diagram for describing a conventional technology 1.
Figure 12:
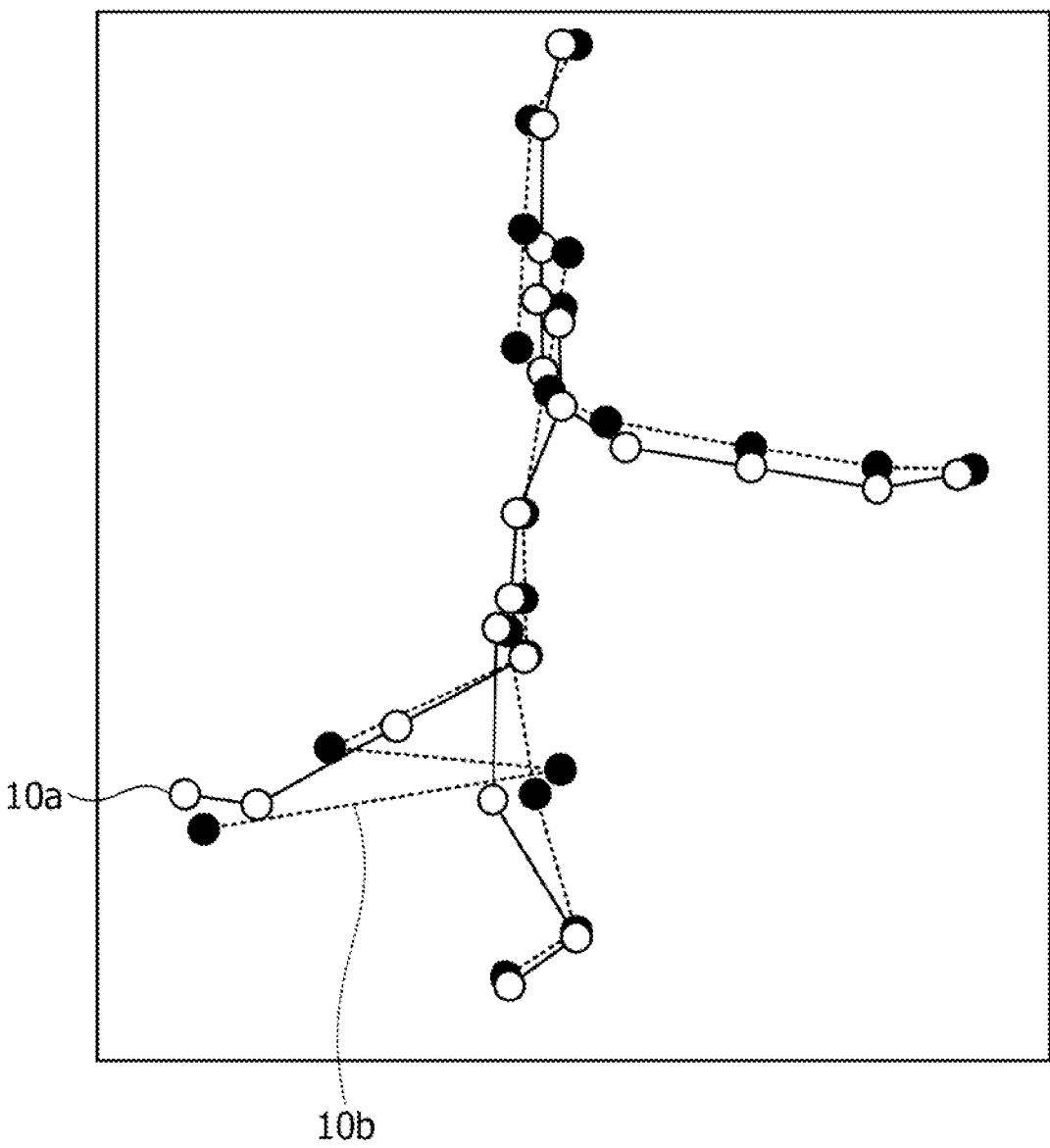
FIG. 12 is a diagram illustrating an example of a skeleton with a large error in a part of joints.

Next, an example of a hardware configuration of a computer that implements functions similar to those of the skeleton recognition device 100 indicated in the embodiment described above will be described. FIG. 10 is a diagram illustrating an example of the hardware configuration of the computer that implements the functions similar to those of the skeleton recognition device of the embodiment.

As illustrated in FIG. 10, a computer 200 includes a CPU 201 that executes various types of arithmetic processing, an input device 202 that receives data input from a user, and a display 203. Furthermore, the computer 200 includes a reading device 204 that reads a program and the like from a storage medium, and a communication device 205 that exchanges data with the camera 20, another external device, or the like via a wired or wireless network. Furthermore, the computer 200 includes a RAM 206 that temporarily stores various types of information, and a hard disk device 207. Additionally, each of the devices 201 to 207 is coupled to a bus 208.

The hard disk device 207 includes a recognition processing program 207*a*, a loss function calculation program 207*b*, a training program 207*c*, and an image data processing program 207*d*. Furthermore, the CPU 201 reads each of the programs 207*a* to 207*d*, and loads them into the RAM 206.

The recognition processing program 207*a* functions as a recognition processing process 206*a*. The loss function calculation program 207*b* functions as a loss function calculation process 206*b*. The training program 207*c* functions as a training process 206*c*. The image data processing program 207*d* functions as an image data processing process 206*d*.

Processing of the recognition processing process 206*a* corresponds to the processing of the recognition processing unit 151. Processing of the loss function calculation process 206*b* corresponds to the processing of the loss function calculation unit 152. Processing of the training process 206*c* corresponds to the processing of the training unit 153. Processing of the image data processing process 206*d* corresponds to the processing of the image data processing unit 154.

Note that each of the programs 207*a* to 207*d* does not necessarily have to be stored in the hard disk device 207 beforehand. For example, each of the programs is stored in a "portable physical medium" to be inserted into the computer 200, such as a flexible disk (FD), a CD-ROM, a DVD, a magneto-optical disk, or an IC card. Then, the computer 200 may read and execute each of the programs 207*a* to 207*d*.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A skeleton recognition device of performing skeleton recognition using an image method, the skeleton recognition device comprising:

one or more memories; and one or more processors coupled to the one or more memories, the one or more processors being configured to:

acquire an output result by inputting teacher data to a training model and processing forward propagation, the teacher data having pairs of skeleton information and input data, the skeleton information indicating positions of a plurality of bones of a human as a correct answer value, the input data being data generated from image data obtained by capturing the human by a camera;

acquire a value of a loss function based on a difference in bone length and a difference in angle of the plurality of bones, bone lengths and angles used for determining the difference in bone length and the difference in angle being based on the skeleton information and based on the output result; and adjust parameters of the training model based on the value of the loss function, wherein the acquiring of the value of the loss function includes:

acquiring a difference in a joint position based on the skeleton information and the output result;

acquiring an order of the difference in the joint position, an order of the difference in the bone length, and an order of the difference in the angle;

acquiring the value of the loss function based on the difference in the joint position, the difference in the bone length, and the difference in the angle;

acquiring a first weight based on a relative magnitude between the order of the difference in the joint position and the order of the difference in the bone length;

acquiring a second weight based on a relative magnitude between the order of the difference in the joint position and the order of the difference in the angle; and acquiring the value of the loss function by integrating a value of the difference in the joint position, a value of the difference in the bone length multiplied by the first weight, and a value of the difference in the angle multiplied by the second weight.

2. A training method implemented by a computer of performing skeleton recognition using an image method, the training method comprising:

acquiring an output result by inputting teacher data to a training model and processing forward propagation, the teacher data having pairs of skeleton information and input data, the skeleton information indicating positions of a plurality of bones of a human as a correct answer value, the input data being data generated from image data obtained by capturing the human by a camera;

acquiring a value of a loss function based on a difference in bone length and a difference in angle of the plurality of bones, bone lengths and angles used for determining the difference in bone length and the difference in angle being based on the skeleton information and based on the output result; and adjusting parameters of the training model based on the value of the loss function, wherein the acquiring of the value of the loss function includes:

acquiring a difference in a joint position based on the skeleton information and the output result;

acquiring an order of the difference in the joint position, an order of the difference in the bone length, and an order of the difference in the angle;

acquiring the value of the loss function based on the difference in the joint position, the difference in the bone length, and the difference in the angle;

acquiring a first weight based on a relative magnitude between the order of the difference in the joint position and the order of the difference in the bone length;

acquiring a second weight based on a relative magnitude between the order of the difference in the joint position and the order of the difference in the angle; and acquiring the value of the loss function by integrating a value of the difference in the joint position, a value of the difference in the bone length multiplied by the first weight, and a value of the difference in the angle multiplied by the second weight.

3. A non-transitory computer-readable storage medium storing a training program of performing skeleton recognition using an image method, the training program comprising instructions which, when executed by at least one computer, cause the at least one computer to execute processing, the processing comprising:

acquiring an output result by inputting teacher data to a training model and processing forward propagation, the teacher data having pairs of skeleton information and input data, the skeleton information indicating positions of a plurality of bones of a human as a correct answer value, the input data being data generated from image data obtained by capturing the human by a camera;

acquiring a value of a loss function based on a difference in bone length and a difference in angle of the plurality of bones, bone lengths and angles used for determining the difference in bone length and the difference in angle being based on the skeleton information and based on the output result; and adjusting parameters of the training model based on the value of the loss function, wherein the acquiring of the value of the loss function includes:

acquiring a difference in a joint position based on the skeleton information and the output result;

acquiring an order of the difference in the joint position, an order of the difference in the bone length, and an order of the difference in the angle;

acquiring the value of the loss function based on the difference in the joint position, the difference in the bone length, and the difference in the angle;

acquiring a first weight based on a relative magnitude between the order of the difference in the joint position and the order of the difference in the bone length;

acquiring a second weight based on a relative magnitude between the order of the difference in the joint position and the order of the difference in the angle; and acquiring the value of the loss function by integrating a value of the difference in the joint position, a value of the difference in the bone length multiplied by the first weight, and a value of the difference in the angle multiplied by the second weight.

\* \* \* \* \*